Patented Aug. 20, 1940

2,212,224

UNITED STATES PATENT OFFICE 2,212,224

ASSISTANTS FOR THE TEXTILE AND RELATED INDUSTRIES AND THEIR MANUFACTURE

Fritz Becherer, Riehen, near Basel, Switzerland, assignor to the firm of J. R. Geigy A. G., Basel, Switzerland No Drawing. Application September 6, 1938, Serial No. 228,681. In Switzerland September 7, 1937

5 Claims. (Cl. 260—512)

According to the present invention new and useful capillary active compounds are obtained by condensing the reaction products of excess bisulphite on unsaturated, aliphatic aldehydes, and ketones with nuclear alkyl phenols or their halogen substitution products. The new compounds are easily soluble in water and colourless and are characterized by their wetting, foaming, dispersing, cleansing and emulsifying properties. They can be used wherever it is important to have these specific properties in the textile, leather, paper, soap and cosmetic industries.

For the production of the new compounds the reaction products of excess bisulphite on unsaturated aliphatic aldehydes and ketones (in the form of their $NH_4$ or alkali salts) may be caused to react on the corresponding phenol in a solution or suspension in sulphuric acid of various concentrations. For facilitating the condensation there may be used further additional substances having a condensation action or which by their dissolving power promote the condensation, such as glacial acetic acid.

Example 1

415 parts of p-diisobutyl phenol are dissolved in 200 parts of glacial acetic acid and whilst stirring there are added carefully 900 parts of 90% sulphuric acid and subsequently 1 mol. of the reaction product of 56 parts of acrolein to 832 parts of sodium bisulphite solution (containing 24% by weight of $SO_2$). After stirring for some hours at 35–40° C. the condensation product has become soluble in water. By pouring into brine the sulphuric acid is separated. The viscous sulphonic acid is neutralized with an alkali such as dilute soda lye and by evaporation there is obtained a bright powdery final product with very excellent wetting properties.

The reaction takes place according to the following equation:

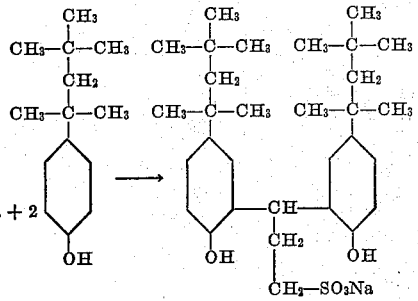

Instead of the p-diisobutyl phenol in the above example, there may be used other nuclear alkyl phenols as for example 4-amyl-, 2-chloro-4-amyl-, 4-dodecyl-, 4-tertiary butylphenol, 4-tertiary butyl-chlorophenol, 4-tertiary butyl-o-cresol, di-isobutyl-crude-cresol. The final products also possess very good capillary active properties.

Example 2

328 parts of p-tert. amyl phenol are introduced at 30° C. into a mixture of 900 parts of concentrated sulphuric acid and 450 parts of glacial acetic acid. To this there is added the quantity of the reaction product, corresponding to 1 mol. of 70 parts of croton aldehyde to 850 parts of sodium bisulphite solution (containing 24.5% by weight of $SO_2$) and stirring further until a sample is clearly water soluble and there is no longer any unchanged amyl phenol present. The separation of the condensation product is completed by stirring with cooking salt solution of Glauber salt solution and the resinous condensation product is separated from the acid mother liquor. By neutralizing with $NH_3$ or an alkali hydroxide there is obtained a product practically colourless, soluble in water, which by evaporation can be obtained in solid powdery form. It possesses a good wetting power and is also stable in strong acid solutions.

The reaction takes place according to the following equation:

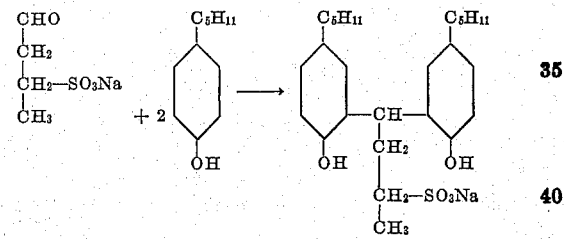

When instead of the p-tert. amyl phenol there is used one of the other phenols indicated in Example 1, condensation products with similar properties are obtained.

When methyl amyl ketone sulphonic acid, produced by the addition of sulphite to butylidene acetone, is condensed under the above conditions with amyl phenol there is obtained a final product with similar properties as also when the reaction product of sulphite to mesityl oxide is condensed with the above mentioned phenols. Other phenols instead of amyl phenol, as for example di-isobutyl-phenol, butyl phenol, butyl or diisobutyl crude cresol and the like, as indicated above, can be condensed with a similar result.

What I claim is:

1. As new products the compounds of the general formula:

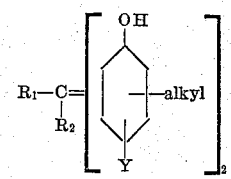

wherein $R_1$ represents an alkyl radical bearing a $SO_3Me$-group, Me being one of the group consisting of H, $NH_4$ and the alkali metals, $R_2$ represents one of the group consisting of H and alkyl and Y being one of the group consisting of H, chlorine and alkyl.

2. As a new product, the compound of the formula

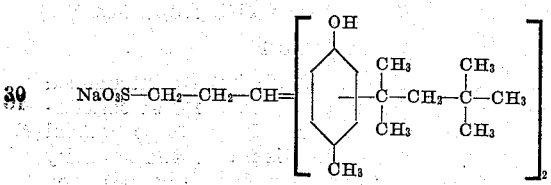

3. As a new product the compound of the formula

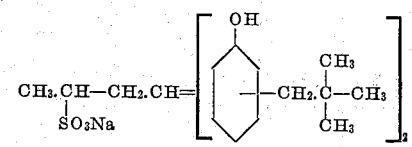

4. As a new product the compound of the formula

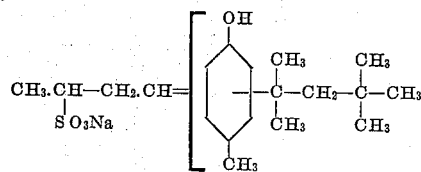

5. Process for the production of new water soluble compounds of the dihydroxy-diphenyl-methane series, comprising causing a compound obtained from the interaction of excess bisulphite on an aliphatic unsaturated compound selected from the group consisting of ketones and aldehydes, to react on a phenol of the formula

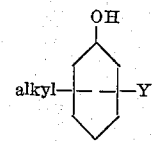

wherein Y means one of the group consisting of H, chlorine and alkyl.

FRITZ BECHERER.